(12) United States Patent
Gailey et al.

(10) Patent No.: US 8,527,421 B2
(45) Date of Patent: Sep. 3, 2013

(54) VIRTUAL CUSTOMER DATABASE

(75) Inventors: Michael L. Gailey, Dunwoody, GA (US); Eric A. Portman, Norcross, GA (US); Michael J. Burgiss, Smyrna, GA (US)

(73) Assignee: Accenture Global Services Limited, Dublin (IE)

( * ) Notice: Subject to any disclaimer, the term of this patent is extended or adjusted under 35 U.S.C. 154(b) by 1177 days.

(21) Appl. No.: 12/327,670

(22) Filed: Dec. 3, 2008

(65) Prior Publication Data

US 2009/0083290 A1    Mar. 26, 2009

Related U.S. Application Data

(62) Division of application No. 10/264,219, filed on Oct. 3, 2002, now Pat. No. 7,472,091.

(60) Provisional application No. 60/326,827, filed on Oct. 3, 2001.

(51) Int. Cl.
*G06F 21/00* (2013.01)

(52) U.S. Cl.
USPC .................. 705/50; 705/1.1; 705/56; 705/59; 707/201; 707/202; 707/203

(58) Field of Classification Search
USPC .............................. 705/50–59; 709/201–203
See application file for complete search history.

(56) References Cited

U.S. PATENT DOCUMENTS

| 5,506,961 | A | 4/1996 | Carlson et al. ................. 395/186 |
| 5,561,769 | A | 10/1996 | Kumar et al. ............ 395/200.05 |
| 5,675,507 | A | 10/1997 | Bobo, II ..................... 364/514 R |
| 5,706,427 | A | 1/1998 | Tabuki ...................... 395/187.07 |
| 5,764,762 | A | 6/1998 | Kazmierczak et al. ........... 380/4 |

(Continued)

FOREIGN PATENT DOCUMENTS

| DE | 197 56 851 A1 | 7/1999 |
| WO | WO 99/55049 A1 | 10/1999 |

(Continued)

OTHER PUBLICATIONS

"Digital cellular telecommunications system (Phase 2+); Universal Mobile Telecommunications System (UMTS); Location Services (LCS) (3GPP TS 22.271 version 5.2.0 Release 5); ETSI TS 122 071" ETSI Standards, European Telecommunications Standards Institute, Sophia Antipolis Cedex France, Sep. 2003, XP014016349.

(Continued)

*Primary Examiner* — Calvin Loyd Hewitt, II
*Assistant Examiner* — Cristina Owen Sherr
(74) *Attorney, Agent, or Firm* — Brinks Hofer Gilson & Lione

(57) ABSTRACT

The present invention includes a virtual customer database system for delivering personalized services to a consumer operating a communication device. The virtual customer database system includes an administrator and a distributed database. The distributed database may be selectively loaded by the administrator with customer related information extracted from participating businesses. The distributed database includes secure databases associated with each participating business and a public participant database. The administrator may process push and pull service requests by selectively querying the distributed database. Sensitive customer specific information may remain with each corresponding participating business while responses to the requests may include personalized customer specific information provided via a common interface standard.

14 Claims, 5 Drawing Sheets

(56) References Cited

U.S. PATENT DOCUMENTS

| | | | |
|---|---|---|---|
| 5,832,209 A | 11/1998 | Krantz | 345/182.1 |
| 5,845,073 A | 12/1998 | Carlin et al. | 395/200.47 |
| 5,850,517 A | 12/1998 | Verkler et al. | 395/200.32 |
| 5,862,325 A | 1/1999 | Reed et al. | 395/200.31 |
| 5,870,549 A | 2/1999 | Bobo, II | 395/200.36 |
| 5,884,262 A | 3/1999 | Wise et al. | 704/270 |
| 5,905,736 A | 5/1999 | Ronen et al. | 370/546 |
| 5,908,469 A | 6/1999 | Botz et al. | 713/201 |
| 5,920,835 A | 7/1999 | Huzenlaub et al. | 704/235 |
| 5,944,824 A | 8/1999 | He | 713/201 |
| 5,953,392 A | 9/1999 | Rhie et al. | 379/88.13 |
| 5,961,593 A * | 10/1999 | Gabber et al. | 709/219 |
| 6,052,367 A | 4/2000 | Bowater et al. | 370/352 |
| 6,070,189 A | 5/2000 | Bender et al. | 709/224 |
| 6,119,167 A | 9/2000 | Boyle et al. | 709/234 |
| 6,138,158 A | 10/2000 | Boyle et al. | 709/225 |
| 6,145,084 A | 11/2000 | Zuili et al. | 713/201 |
| 6,157,941 A | 12/2000 | Verkler et al. | 709/202 |
| 6,161,139 A | 12/2000 | Win et al. | 709/225 |
| 6,173,259 B1 | 1/2001 | Bijl et al. | 704/235 |
| 6,181,781 B1 | 1/2001 | Porter et al. | 379/88.17 |
| 6,182,142 B1 | 1/2001 | Win et al. | 709/229 |
| 6,182,144 B1 | 1/2001 | England | 709/232 |
| 6,219,638 B1 | 4/2001 | Padmanabhan et al. | 704/235 |
| 6,236,768 B1 | 5/2001 | Rhodes et al. | 382/306 |
| 6,243,816 B1 | 6/2001 | Fang et al. | 713/202 |
| 6,249,291 B1 | 6/2001 | Popp et al. | 345/473 |
| 6,263,358 B1 | 7/2001 | Lee et al. | 709/100 |
| 6,282,270 B1 | 8/2001 | Porter | 379/88.17 |
| 6,301,245 B1 * | 10/2001 | Luzeski et al. | 370/352 |
| 6,314,108 B1 | 11/2001 | Ramasubramani et al. | 370/465 |
| 6,333,973 B1 | 12/2001 | Smith et al. | 379/88.12 |
| 6,345,245 B1 | 2/2002 | Sugiyama et al. | 704/10 |
| 6,385,586 B1 | 5/2002 | Dietz | 704/277 |
| 6,393,467 B1 | 5/2002 | Potvin | 709/217 |
| 6,401,211 B1 | 6/2002 | Brezak, Jr. et al. | 713/201 |
| 6,405,033 B1 | 6/2002 | Kennedy, III et al. | 455/414 |
| 6,449,344 B1 | 9/2002 | Goldfinger et al. | 379/88.17 |
| 6,453,337 B2 | 9/2002 | Miller et al. | 709/204 |
| 6,473,612 B1 | 10/2002 | Cox et al. | 455/414 |
| 6,483,899 B2 | 11/2002 | Agraharam et al. | 377/88.14 |
| 6,504,910 B1 | 1/2003 | Engelke et al. | 379/52 |
| 6,510,417 B1 | 1/2003 | Woods et al. | 704/275 |
| 6,513,003 B1 | 1/2003 | Angell et al. | 704/235 |
| 6,516,316 B1 | 2/2003 | Ramasubramani et al. | 707/9 |
| 6,523,063 B1 | 2/2003 | Miller et al. | 709/206 |
| 6,546,005 B1 | 4/2003 | Berkley et al. | 370/353 |
| 6,587,835 B1 | 7/2003 | Treyz et al. | 705/14 |
| 6,594,348 B1 | 7/2003 | Bjurstrom et al. | 379/88.13 |
| 6,598,018 B1 | 7/2003 | Junqua | 704/251 |
| 6,647,257 B2 | 11/2003 | Owensby | 455/414.1 |
| 6,647,272 B1 | 11/2003 | Asikainen | 455/466 |
| 6,681,115 B1 | 1/2004 | McKenna et al. | 455/517 |
| 6,687,339 B2 | 2/2004 | Martin | 379/88.14 |
| 6,697,474 B1 | 2/2004 | Hanson et al. | 379/201.01 |
| 6,721,288 B1 | 4/2004 | King et al. | 370/310 |
| 6,725,252 B1 | 4/2004 | Mall et al. | 709/203 |
| 6,728,758 B2 | 4/2004 | Sato | 709/206 |
| 6,741,856 B2 | 5/2004 | McKenna et al. | 455/422.1 |
| 6,742,022 B1 | 5/2004 | King et al. | 709/219 |
| 6,754,665 B1 | 6/2004 | Kawamoto et al. | 707/102 |
| 6,757,718 B1 | 6/2004 | Halverson et al. | 709/219 |
| 6,775,360 B2 | 8/2004 | Davidson et al. | 379/88.14 |
| 6,782,253 B1 | 8/2004 | Shteyn et al. | 455/414.1 |
| 6,782,419 B2 | 8/2004 | Tobita et al. | 709/219 |
| 6,816,835 B2 | 11/2004 | Hayashi | 704/260 |
| 6,820,204 B1 | 11/2004 | Desai et al. | 713/201 |
| 6,826,407 B1 | 11/2004 | Helferich | 455/466 |
| 6,826,692 B1 | 11/2004 | White | 713/201 |
| 6,829,334 B1 | 12/2004 | Zirngibl et al. | 379/88.17 |
| 6,834,195 B2 | 12/2004 | Brandenberg et al. | 455/456.3 |
| 6,848,542 B2 | 2/2005 | Gailey et al. | 186/35 |
| 6,859,451 B1 | 2/2005 | Pasternack et al. | 370/352 |
| 6,885,861 B2 | 4/2005 | Koskelainen | 455/414.2 |
| 6,895,084 B1 | 5/2005 | Saylor et al. | 379/88.22 |
| 6,907,112 B1 | 6/2005 | Guedalia et al. | 379/88.17 |
| 6,912,582 B2 * | 6/2005 | Guo et al. | 709/229 |
| 6,925,307 B1 | 8/2005 | Mamdani et al. | 455/466 |
| 6,944,447 B2 | 9/2005 | Portman et al. | 455/422.1 |
| 6,950,947 B1 | 9/2005 | Purtell et al. | 713/201 |
| 6,954,641 B2 | 10/2005 | McKenna et al. | 455/435.1 |
| 7,003,082 B2 | 2/2006 | Engelke et al. | 379/52 |
| 7,020,251 B2 | 3/2006 | Zirngibl et al. | 379/88.17 |
| 7,233,655 B2 | 6/2007 | Gailey et al. | 379/210.01 |
| 7,254,384 B2 | 8/2007 | Gailey et al. | 455/412 |
| 7,412,260 B2 | 8/2008 | Gailey et al. | 455/563 |
| 7,437,295 B2 | 10/2008 | Pitts, III et al. | 704/275 |
| 7,441,016 B2 | 10/2008 | Gailey et al. | 709/219 |
| 7,472,091 B2 | 12/2008 | Gailey et al. | 705/51 |
| 7,483,693 B2 * | 1/2009 | Lueng et al. | 455/414.1 |
| 7,640,006 B2 | 12/2009 | Portman et al. | 455/412.1 |
| 7,640,360 B1 | 12/2009 | Kawamoto et al. | 709/246 |
| 8,073,920 B2 | 12/2011 | Gailey et al. | 709/207 |
| 2001/0024496 A1 | 9/2001 | Bolduc et al. | 379/222 |
| 2001/0049275 A1 | 12/2001 | Pierry et al. | 455/414 |
| 2001/0052015 A1 * | 12/2001 | Lin et al. | 709/226 |
| 2002/0004736 A1 | 1/2002 | Roundtree et al. | 705/10 |
| 2002/0022453 A1 * | 2/2002 | Balog et al. | 455/41 |
| 2002/0035607 A1 | 3/2002 | Checkoway et al. | 709/206 |
| 2002/0049907 A1 | 4/2002 | Woods et al. | 713/182 |
| 2002/0055351 A1 | 5/2002 | Elsey et al. | 455/414 |
| 2002/0061741 A1 | 5/2002 | Leung et al. | 455/414 |
| 2002/0068551 A1 | 6/2002 | Strunk et al. | 455/414 |
| 2002/0091829 A1 | 7/2002 | Wood et al. | 709/227 |
| 2002/0107925 A1 | 8/2002 | Goldschneider et al. | 709/206 |
| 2002/0112007 A1 | 8/2002 | Wood et al. | 709/206 |
| 2002/0119793 A1 | 8/2002 | Hronek et al. | 455/466 |
| 2002/0137491 A1 | 9/2002 | Pentikainen et al. | 455/412 |
| 2002/0144108 A1 * | 10/2002 | Benantar | 713/156 |
| 2002/0161646 A1 | 10/2002 | Gailey et al. | 705/14 |
| 2002/0161647 A1 | 10/2002 | Gailey et al. | 705/14 |
| 2003/0008661 A1 | 1/2003 | Joyce et al. | 455/456 |
| 2003/0078034 A1 | 4/2003 | Tsutsumi et al. | 455/412 |
| 2004/0054935 A1 | 3/2004 | Holvey et al. | 713/202 |
| 2004/0059790 A1 | 3/2004 | Austin-Lane et al. | 709/207 |
| 2004/0166832 A1 | 8/2004 | Portman et al. | 455/412.1 |
| 2004/0243417 A9 | 12/2004 | Pitts, III et al. | 704/276 |
| 2005/0020250 A1 | 1/2005 | Chaddha et al. | 455/414.1 |
| 2005/0027590 A9 | 2/2005 | Gailey et al. | 705/14 |
| 2005/0027591 A9 | 2/2005 | Gailey et al. | 705/14 |
| 2005/0102180 A1 | 5/2005 | Gailey et al. | 705/14 |
| 2008/0270224 A1 | 10/2008 | Portman et al. | 705/10 |
| 2009/0098662 A1 | 4/2009 | Birch et al. | 455/414.1 |

FOREIGN PATENT DOCUMENTS

| | | |
|---|---|---|
| WO | WO 00/17854 A1 | 3/2000 |
| WO | WO 00/20962 A | 4/2000 |
| WO | WO 00/21232 A2 | 4/2000 |
| WO | WO 00/21232 A3 | 11/2000 |
| WO | WO 01/03011 A2 | 1/2001 |
| WO | WO 01/69422 A2 | 9/2001 |
| WO | WO 01/03011 A3 | 1/2003 |

OTHER PUBLICATIONS

U.S. Appl. No. 12/245,508, filed Oct. 3, 2008, Gailey et al.

"Digital cellular telecommunications system (Phase 2+) (GSM); Universal Mobile Telecommunications System (UMTS); Functional stage 2 description of location services (3GPP TS 23.271 version 5.2.0 Release 5); ETSI TS 123 271" ETSI Standards, European Telecommunication Standards Institute; Sophia-Antipo, FR, vol. 3-SA2, No. V520, Mar. 2002 XP014007890.

European Search Report in corresponding European Patent Application No. 10183995.9, dated Sep. 15, 2011; 8 pgs.; European Patent Office, Munich, Germany.

* cited by examiner

VIRTUAL CUSTOMER DATABASE

This application is a division of U.S. patent application Ser. No. 10/264,219, filed on Oct. 3, 2002, now U.S. Pat. No. 7,472,091, and entitled VIRTUAL CUSTOMER DATABASE and claims the benefit pursuant to 35 U.S.C. §119 of U.S. Provisional Application Ser. No. 60/326,827, filed Oct. 3, 2001 entitled VIRTUAL CUSTOMER DATABASE. In addition, the following commonly owned patent applications, some of which are incorporated by reference in the present application, are related to this application: U.S. Pat. No. 7,441,016 B2, issued Oct. 21, 2008, entitled SERVICE AUTHORIZER; U.S. Pat. No. 7,254,384 B2, issued Aug. 7, 2007, entitled MULTI-MODAL MESSAGING; U.S. Pat. No. 7,233,655 B2, issued Jun. 19, 2007, entitled MULTI-MODAL CALLBACK; U.S. patent application Ser. No. 10/751,022, filed Jan. 2, 2004, entitled DIRECTORY ASSISTANCE WITH MULTI-MODAL MESSAGING; and U.S. patent application Ser. No. 12/245,508, filed Oct. 3, 2008, entitled SERVICE AUTHORIZER.

FIELD OF THE INVENTION

The present invention relates generally to providing information to communication devices and, more particularly, to a virtual customer database system capable of providing personalized consumer services to communication devices.

BACKGROUND

Wireless communication devices are becoming an increasingly prevalent way to send and receive information. In addition to audio related content, the use of wireless communication devices for information content, video content and other services is rapidly increasing. The proliferation of various wireless communication devices, such as, for example, notebook computers, palm-top computers, and personal digital assistants (PDAs), as well as increasingly multi-functional wireless phones is further indication of the growing demand for different types of content and services.

One of the challenges for providers of such wireless services involves the ability to personalize content and services for individual users. An area where significant personalized content and services may be made available is consumer information related to goods and services. Such goods and services may include, for example, banking, financial management, travel, consumer goods, insurance, utility services and the like. Inherently, a consumer profile that provides such personalized content includes information related to many different business and content providers, such as, for example account numbers, passwords, personalized data, usage profiles, security clearances, preferences, tastes, spending habits, etc.

Existing systems and methods for creating and utilizing broad, multi-company consumer profiles for the enablement of personalized content and services (both wireless and non-wireless) are typically managed by the consumer and/or by a third party agency. Consumer management generally involves reliance upon the consumer to identify themselves, and input personally relevant information into a profile. The profile may then be maintained and updated by the consumer as the information and related data changes.

In general, third party agencies collect consumer profile data from multiple businesses and content providers for storage in a central location. Accordingly, control of the data significantly shifts from the businesses and content providers who provide the data, to the third party agency. In addition, prior consumer authorization may be required of the businesses and content providers before such data may be shared with a third party agency. Further, making such data available to third party agencies may amount to sharing of competitively sensitive information among business and content providers who may directly compete for the same consumers.

SUMMARY

The invention includes a method and system for delivering personalized services to a consumer operating a communication device. The personalized services are provided by a plurality of participating businesses cooperatively operating within a virtual customer database (VCDB) system. The VCDB system allows each of the participating businesses to maintain control of sensitive customer related information while making customer related information available to an individual consumer. Accordingly, the VCDB system may leverage the customer information of the participating businesses to provide a broad, multi-company consumer profile for enabling personalized content and services on a common platform without requiring the participating business to share sensitive customer related information.

The VCDB system includes an administrator, a distributed database and participating businesses that may include a participating communication provider and a participating company. The distributed database may include participating business databases comprising a first database which is a participating communication provider database and a second database which is a participating company database. The participating communication provider database and the participating company database may be associated with the participating communication provider and the participating company, respectively. In addition, the distributed database may include a third database which is a public participant database.

The administrator may extract customer information from each of the participating businesses and selectively associate the customer information from the extract with a virtual key of each corresponding consumer. In addition, the administrator may selectively distribute the customer information and the associated virtual keys within the distributed database by storing public records in the public participant database and private records in the participating communication provider database and the participating company database. Private customer records may include sensitive customer information, while such sensitive information may be absent from public customer records.

With the public and private customer records, the administrator may receive and process pull service requests from consumers operating communication devices and push service requests from participating businesses. The requests for pull services may be requests for customer specific information and the requests for push services may be customer notification requests.

Upon receipt of a pull services request from a communication device, the administrator may query the participating communication provider database for a virtual key associated with the consumer operating the communication device. In addition, the administrator may query the participating company database for an internal customer ID based on determining the intent of the request for customer specific information and the virtual key. The administrator may then forward the request for customer specific information and the internal customer ID to the participating business identified by the intent of the request. The request may be forwarded to obtain customer specific information responsive to the request.

Upon receiving a request for push services, the administrator may querying the participating company database for a virtual key based on an internal customer ID included in the request. In addition, the administrator may query the public participant database for a communication channel of a communication device associated with the virtual key. Once the communication channel is identified, the administrator may query the participating communication provider database for a device address of the communication device. Using the device address, a notification message may be transmitted to the communication device.

An interesting feature of the VCDB system relates to the public participant database. The public participant database comprises a consumer internal profile database that may include communication channels associated with participating communication providers. In addition, the consumer internal profile database may include pre-determined contact parameters associated with the communication channels. The consumer may configure the pre-determined contact parameters to establish situationally based consumer preferences regarding utilization of different communication channels to contact the consumer.

Another interesting feature of the VCDB system relates to the distributed databases. The participating communication provider database and the participating company database may be located within the firewall of the participating communication provider and the participating company, respectively. Accordingly, the administrator may be provided access through the respective firewalls to the respective databases. In addition, the public participant database may be outside the firewalls of any of the participating businesses and is similarly accessible by the administrator.

Still another interesting feature related to the VCDB system involves the administrator. The administrator may perform usage tracking to gather information related to consumer usage of the push and pull services of the VCDB system. In addition, the administrator may perform data mining to statistically analyze usage.

Further objects and advantages of the present invention will be apparent from the following description, reference being made to the accompanying drawings wherein preferred embodiments of the invention are clearly illustrated.

DETAILED DESCRIPTION OF THE PRESENTLY PREFERRED EMBODIMENTS

The invention includes methods and systems for creating and utilizing a distributed database of customer information. The distributed database may be used to deliver personalized services to consumers using electronic communication channels. The distributed database is enabled through a loose association of customer specific information from participating businesses that may include companies, content providers etc., in order to enable broad profiles of consumers. The customer specific information of each participating business may be securely maintained by that participating business, but may be enabled for real-time external access by consumers using a virtual customer database system. Accordingly, broad consumer profiles may be created within the virtual customer database system without requiring disclosure to third parties and/or direct sharing of consumer information between participating businesses.

Figure 1:
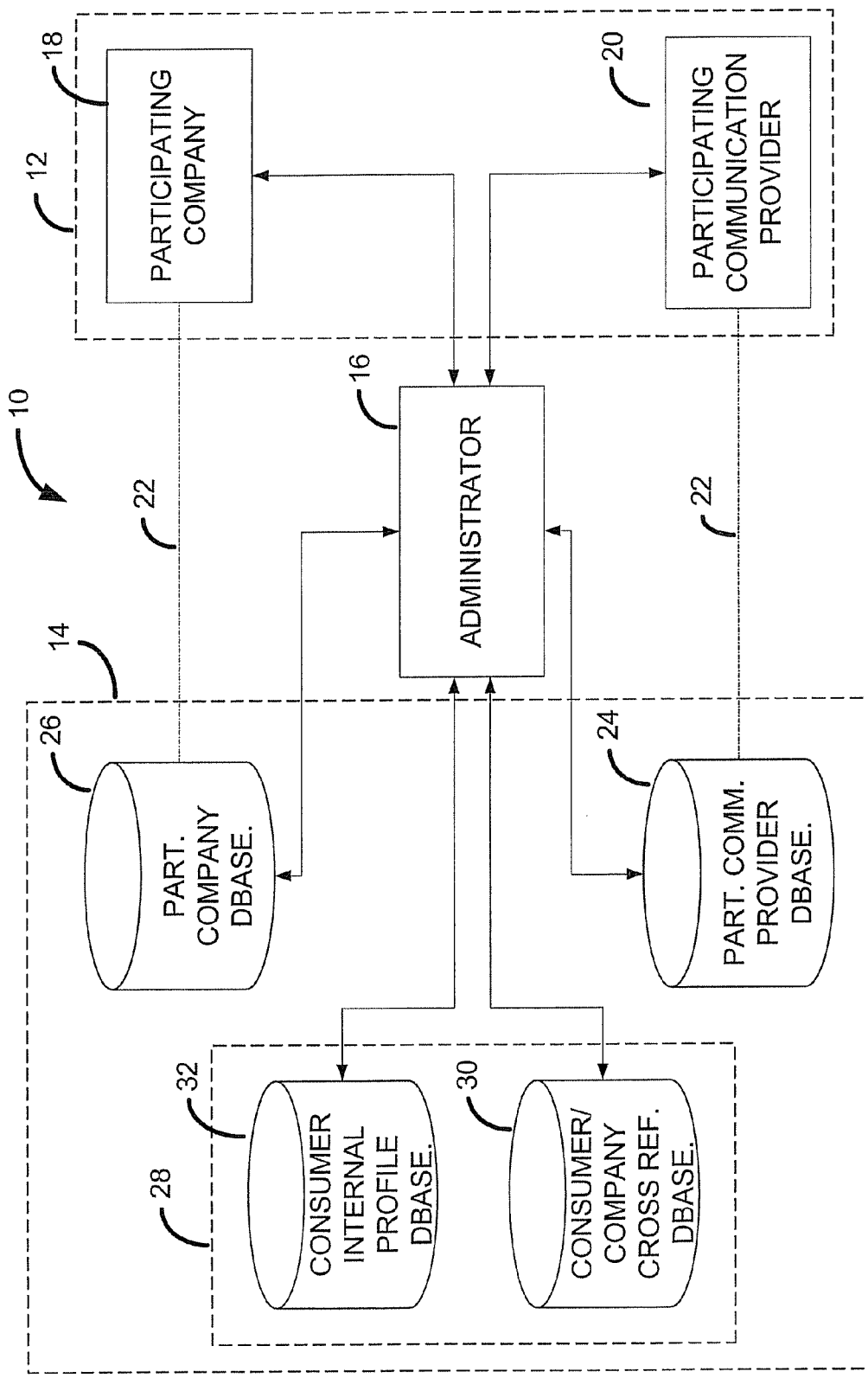
FIG. 1 illustrates an example of the virtual customer database (VCDB) system.

FIG. 1 is a block diagram illustrating one example of a virtual customer database (VCDB) system 10. The VCDB system 10 includes a plurality of participating businesses 12, a distributed database 14 and an administrator 16 coupled as illustrated. As used herein, the term "coupled", "connected", or "interconnected" may mean electrically coupled, optically coupled, wirelessly coupled and/or any other form of coupling providing an interface between systems, devices and/or components.

The participating businesses 12 represent information-based systems of businesses providing goods and/or services to consumers. The information-based systems may include customer data storage systems, data retrieval systems, communication systems and/or any other systems supporting customer record keeping related to the supply of goods and/or services. The data stored in such systems may include any form of customer specific data related to providing goods and/or services to each consumer. Typically, the participating businesses 12 are protected from unauthorized access by a firewall or other security measures.

As used herein, the term "consumer" refers to users of the VCDB system 10 for personalized services. The term "customer" on the other hand, refers to information and services related to consumption/utilization of goods and/or services by such consumers.

In the illustrated example, the participating businesses 12 may include at least one participating company 18 and at least one participating communication provider 20. The participating company 18 may be any independent company, such as, for example, an airline company, a manufacturing company, a utility company or any other business providing goods and/or services to consumers. The participating communication provider 20 may be any business providing communication services to consumers, such as, for example, a wireless phone service provider, a wireline phone service provider, a paging service provider, an email service provider, an interactive messaging provider, an Internet access provider or any other provider of communication services over electronic communication channels. In other examples any number of participating companies and participating communication providers may be included in the participating businesses 12 of the VCDB system 10.

The distributed database 14 may include one or more secure databases accessible by one or more database management systems (DBMS). The presently preferred distributed database 14 includes separate, secure, participating business databases for each of the participating businesses 12. The participating business databases may each include customer specific information extracted from associated participating businesses 12. As illustrated by dashed lines 22 in FIG. 1, a first database identified as a participating communication provider database 24 is preferably associated with the participating communication provider 20. In addition, a second database identified as a participating company database 26 is preferably associated with the participating company 18. Alternatively, the participating communication provider database 24 and the participating company database 26 may be included along with any other participating businesses 12 in a common secure database. Within the common secure database, passwords or other security measures may be used to limit access to the different areas of the database pertaining to each of the participating businesses 12.

The distributed database 14 may also include a third database identified as a shared participant database 28. The shared participant database 28 is at least one database common to all of the participating businesses 12. Non-sensitive information related to each of the participating businesses 12 may be included in the shared participant database 28. In addition, administrative and operating information related to the VCDB system 10 may be included in the shared participant database 28. For example, account information related to consumers subscribing to the personalized services of the VCDB system 10, consumer utilization information, consumer customization of personalized services and/or any other consumer information related to the VCDB system 10 may be included.

The shared participant database 28 of the illustrated example includes a consumer/company cross reference database 30 cooperatively operating with a consumer internal profile database 32. The shared participant database 28 may include non-sensitive general information related to each of the participating businesses 12. In addition, the shared participant database 28 may include consumer specific information for each consumer. The shared participant database 28 may also include any other information related to operation of the VCDB system 10 in providing personalized services to consumers. The consumer/company cross reference database 30 and the consumer internal profile database 32 may be collocated in the same database, or may be two separate databases operating on the same, or different, hardware platforms.

The consumer/company cross reference database 30 may include information to cross reference each of the participating businesses 12 to corresponding consumers utilizing the VCDB system 10. Consumers utilizing goods and services of the participating businesses 12 may be cross referenced to corresponding company IDs within the shared participant database 28. The company IDs may be the name of the company from which the information was extracted, a code representing the company and/or any other form of unique identifier. In addition, the consumer/company cross reference database 30 may include any other information pertaining to associating consumers with the participating businesses 12.

The consumer internal profile database 32 may include information related to each consumer enabled to utilize the VCDB system 10. The consumer related information may be selectively associated with individual company IDs and may include a consumer's name and address (past and present) as well as consumer specific contact information and pre-determined contact parameters. The consumer specific contact information may identify electronic communication channels for delivery of personalized services based on the pre-determined contact parameters. The electronic communication channels may be identified by associating communication device(s) of each consumer with company ID(s) of the participating communication provider(s) 20. The pre-determined contact parameters may include, for example, time period designations, content designations, originator designations, preference rankings or any other considerations related to utilization of the contact information.

For example, the consumer specific contact information may indicate three electronic communication channels utilized by a wireless phone, a pager and a PDA, each serviced by a different one of the participating businesses 12 identified with a company ID. In addition, pre-determined contact parameters may identify the pager as the first choice for daytime delivery of personalized services and the wireless phone as the first choice for nighttime delivery. Further, the pager may be identified to receive text messages from one of the participating businesses 12 while the PDA may be identified to receive multimedia messages from another of the participating businesses 12.

In addition, the consumer internal profile database 32 may also include consumer verification data. The consumer verification data may be provided during and/or following subscription to the VCDB system 10 for personalized services. Verification of consent by the consumer, and/or the participating businesses 12, to the release and use of consumer/customer information that may be needed to process requests may be provided by the consumer verification data. In addition, verification may involve determining the level of personalized services within the VCDB system 10 a consumer has purchased. Further, any other consumer specific information may be included within the consumer internal profile database 32.

The separate secure databases of the distributed database 14 may be located remotely or locally. Preferably, the participating communication provider database 24 and the participating company database 26 reside remotely within the firewalls of the corresponding participating businesses 12. The databases may be enabled for external access via technologies such as, for example, extensible markup language (XML), simple object (SOAP), common object request broker architecture (CORBA), hypertext transfer protocol (HTTP), hypertext markup language (HTML), remote message interface (RMI), Internet inter object request broker (ORB) protocol (IIOP) and/or any other proprietary/non-proprietary interface technologies. Alternatively, the participating communication provider database 24 and the participating company database 26 may be collocated locally with the shared participant database 28, the administrator 16 and/or themselves.

The administrator 16 may be one or more applications operating to oversee and direct operation of the VCDB system 10. Operation of the administrator 16 may occur on one or more server computers or other devices capable of communication with the participating businesses 12 and the distributed database 14. In general, the administrator 16 maintains the VCDB system 10 and acts as an interface to deliver personalized services to a consumer over electronic communication channels.

Two types of services may be leveraged with the VCDB system 10 using the administrator 16.

The first type of services is pull services where content is provided based on incoming requests from consumers for customer specific information. Examples of pull services requests may include requests for an airline itinerary, a bank statement, an order status, a service schedule or any other customer specific information related to goods and/or services purchased by a consumer. The requests may be forwarded over electronic communication channels from wireless or wireline communication devices operated by consumers. The administrator 16 may receive such requests and utilize the distributed database 14 to authorize and format such requests with customer specific information. The formatted requests may then be forwarded to the appropriate participating business within the participating businesses 12. Based on the request, a response that includes customer specific information may be provided to the consumer who originated the request.

The second type of services is push services where content is provided to consumers based on incoming requests initiated by an external event and/or predetermined preferences of a consumer. Examples of push services requests may include requests for notification of consumer(s) regarding a delayed airline flight, a checking account overdraft, non-payment of a bill, backordered goods/services that are now available, or any other personalized notification related to the provision of goods and services by the participating businesses 12. Such requests may be received, authorized, formatted and forwarded by the administrator 16 to the identified consumer. The requests may be forwarded over an electronic communication channel to a communication device, such as, for example, a wireless communication device. The electronic communication channels may be selected based on predetermined instructions from the consumers.

Any participating business desiring interactions with customers via electronic communication channels may utilize the VCDB system 10. Since requests for pull services are handled by the VCDB system 10, incoming requests from consumers need not include sensitive customer specific information. In addition, incoming requests for push services for consumer notification need not include sensitive destination address information. Further sensitive customer information may remain with each of the participating businesses 12 within associated separate secure databases. Accordingly, customer information may remain within the "four walls" of each participating business that is collecting and using such information to provide goods and/or services. Utilizing the distributed database 14 and the administrator 16, however, personalized customer information and other services may be enabled for real-time secure external access by consumers via a common interface standard.

As used herein, the term "sensitive information" pertains to information considered by a consumer to be private and/or personal. In addition, "sensitive information" includes information considered by any of the participating businesses 12 to be confidential, proprietary and/or would otherwise provide a competitive advantage to competitors.

Figure 2:
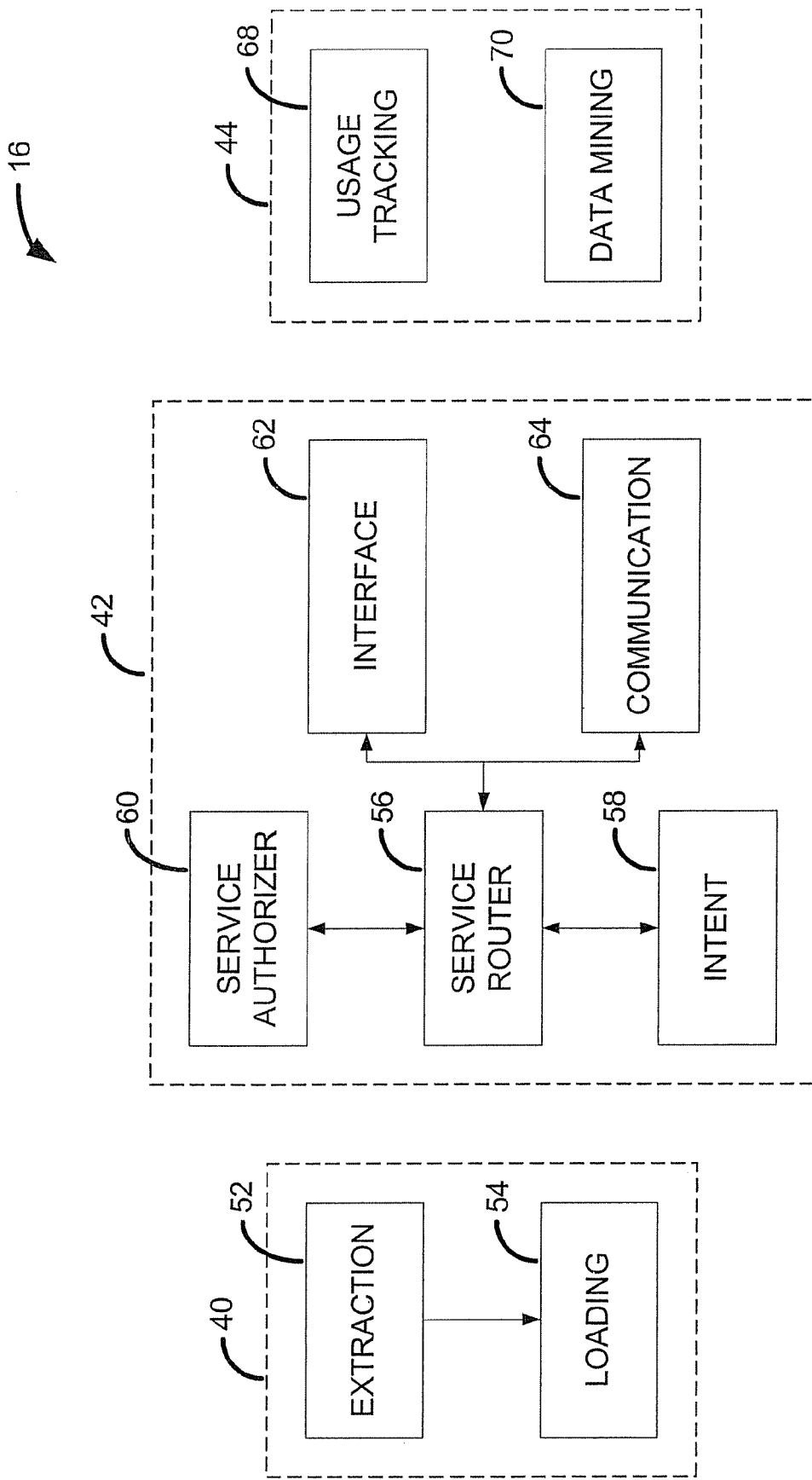
FIG. 2 is a block diagram of the administrator depicted in FIG. 1.

FIG. 2 is an example block diagram illustrating the functionality of the administrator 16 depicted in FIG. 1. The administrator 16 includes a load and scrub processing module 40, a request-handling module 42 and a transaction-monitoring module 44. In other examples, fewer or more modules may be illustrated to depict the functionality of the administrator 16.

The load and scrub processing module 40 includes an extraction component 52 and a loading component 54 cooperatively operating as illustrated. In general, the load and scrub processing module 40 directs the extraction and selective distribution within the distributed database 14 (FIG. 1) of customer information from the participating businesses 12 (FIG. 1). The term "load" refers to the insertion of records within the separate secure databases of the distributed database 14. The term "scrub" refers to the selective allocation of information to separate (or "scrub") sensitive information from non-sensitive information. The load and scrub processing module 40 may also include additional functionality such as, for example, data verification, removal of duplications, resolution of nicknames, misspellings, maiden/married name mapping, resolution of address spelling variants (e.g. "Cooper Lake Dr." and "Cooperlake Dr." or "Rain Tree Road" and "Rain Tree Rd") or any other processes related to selective data distribution within the distributed database 14.

Referring now to FIGS. 1 and 2, extraction of the customer information is performed with the extraction component 52. The extraction component 52 may communicate with each of the participating businesses 12 to obtain an extract of customer information. Each extract represents the customer information of one of the participating businesses 12, and may be identified with a corresponding company ID. The company ID may be provided along with the extracted customer information from each of the participating businesses 12. Alternatively, the extraction component 52 may be capable of identifying each of the participating businesses 12 and assigning the appropriate company ID. In another alternative, the extraction component 52 may cross reference the company name or other identifying information obtained in the extract with the shared participant database 28, or any other database, to identify the company ID.

The extract may include a customer name and a customer address associated with an internal customer ID. In addition, where the participating businesses 12 are a participating communication provider 20, enabled communication channel(s) may also be included in the extract. The customer name and address represent each customer of one of the participating businesses 12. The internal customer ID is an identifier to uniquely identify each customer, such as, for example, an account number, a frequent flier number (for an airline company) or any other way of uniquely identifying customers within a business' record keeping system.

The enabled communication channel(s) identify electronic communication channel(s) and device address(es) supported by the participating communication provider 20 for contacting the corresponding customer. For example, for a given customer the enabled electronic communication channels may include device addresses for an instant messaging address, an email address and a wireless phone number. In addition, any other information associated with uniquely identifying the communication channel(s) and corresponding device address(es) for a customer may be included in the extract. Any other customer related information may also be included in the extract, such as preferences for which method used to contact, schedules corresponding to which method of contact to use, length of message the device can receive (e.g. some mobile phones only accept 55 characters, some accept 255 characters).

Following extraction, the information within the extract may be compared by the extraction component 52 to a list of subscribing consumers. The list of subscribing consumers may be a listing of individuals currently enabled to utilize the VCDB system 10 for personalized services. Each entry in the listing of subscribing consumers may include a virtual key associated with the name(s) and current/past addresses of the individual. Alternatively, the virtual key may be associated with any other information indicative of the identity of a consumer that may be compared and selectively matched to the extracted information.

The virtual key may be a unique hash code or other similar unique identifier that is a universal but anonymous identifier uniquely representing each consumer utilizing the personalized services of the VCDB system 10.

The extraction component 52 may query the consumer internal profile database 32 for the list of subscribing consumers. Alternatively, the extraction component 52 may maintain the list of subscribing consumers. In still other alternatives, the list of subscribing consumers may be stored elsewhere and accessed by the extraction component 52. The extraction component 52 may use the list of subscribing consumers to determine potential matches with the customer information contained in the extract. For each properly identified consumer in the extract, the extraction component 52 may associate the virtual key of the identified consumer with the corresponding customer information and activate the loading component 54.

The loading component 54 may selectively load information from the extract along with the associated virtual keys into the distributed database 14. The information may be selectively utilized by the loading component 54 to generate records that are inserted into one or more of the secure databases within the distributed database 14. The records generated by the loading component 54 may include public customer records and private customer records. Public customer records may include customer information of participating businesses 12 which is not sensitive or otherwise deemed confidential by the participating businesses 12. Private customer records, on the other hand, may include sensitive customer information.

Referring again to FIGS. 1 and 2, the loading component 54 may insert a public customer record into the consumer/company cross reference database 30 for each properly identified customer in the extract. The public customer record inserted by the loading component 54 may include the virtual key of the consumer associated with the company ID identified in the extract. Alternatively, any other data for cross-referencing the consumer to one of the participating businesses 12 from which customer information was extracted may be part of the public customer record.

In addition to loading public customer records, the loading component 54 may also load private customer records of properly identified consumers into the distributed database 14. The company ID associated with the extract may preferably be used to determine which secure database(s) within the distributed database 14 are loaded with private customer records. In addition, the company ID may preferably be used to determine the information content of the private customer records. Other factors, such as, other participating businesses, consumer preferences or any other parameters may also be included in the information content determination.

In the example illustrated in FIG. 1, if the extract was from the participating communication provider 20, the loading component 54 may generate and insert private customer records in the participating communication provider database 24. Based on the company ID of the participating communication provider 20, the private customer records preferably include the virtual key associated with the internal customer ID of each customer of the participating communications provider 20, along with the enabled communication channel(s). In addition, the company ID may be included in private customer records. The company ID may be included where the customer information in the participating communication provider database 24 includes information from multiple participating businesses 12.

If, on the other hand, the extract was from a participating company 18, for each properly identified customer, a private customer record may be generated and inserted in the participating company database 26. In this case, based on the company ID, the private customer record may include the virtual key associated with the internal customer ID for each customer of the participating company 18. Similar to the participating communication provider database 24, the company ID may also be include where information from multiple participating businesses 12 is included in the same participating company database 26.

Processing with the load and scrub processing module 40 may be repeated for each of the participating businesses 12. With the customer information extracted, scrubbed and loaded by the load and scrub processing module 40, the VCDB system 10 may utilize the distributed database 14 to provide personalized services. Personalized services may be provided in response to requests forwarded to the request-handling module 42.

Referring again to FIG. 2, the request-handling module 42 of the illustrated example includes a service router component 56, an intent component 58, a service authorizer component 60, an interface component 62 and a communication component 64 cooperatively operating as illustrated. The request-handling module 42 receives and processes requests for push and pull services. In addition, responses to requests may be formatted and forwarded by the request-handling module 42.

As previously discussed requests originating from consumers may be addressed by the pull services of the VCDB system 10 (FIG. 1). Consumers may initiate requests via an electronic communication channel using for example a wireless communication device. Electronic communication channels may include, for example, short message service (SMS), 2-way text, voice-interface to a voice recognition system, interactive messaging, a chat-system or any other mechanism for initiating a request. Alternatively, any other form of access channel may be used with wireless or wireline communication devices.

Requests over an electronic communication channel may also originate from an external event or preferences of the consumer as part of push services provided by the VCDB system 10 (FIG. 1). Such requests may originate from one of the participating businesses 12 (FIG. 1), in the form of, for example, information manually entered via a website and/or based on an automated request process triggered by events/data within the participating business. In addition, email messages, HTTP requests, or any other form of request for push services may be sent to the request-handling module 42. Such requests are received and processed by the service router component 56.

Referring once again to FIGS. 1 and 2, the service router component 56 receives requests and initiates queries of the distributed database 14 based on the requests. In addition, the service router component 56 activates the other components in the request-handling module 42 to process the requests. The service router component 56 may also perform other functions such as, for example, initiating and/or maintaining secure connections, such as, secure socket layer (SSL) communication with other devices in the VCDB system 10, maintenance of the secure databases and/or any other operationally related functionality of the VCDB system 10.

The service router component 56 may also process a request to identify an electronic communication channel for messages responsive to the request. An electronic communication channel identified in the request may be designated for messages responsive to the request. Alternatively, the electronic communication channel for responses may default to the channel the request was received from. In another alternative, the service router component 56 may query the consumer internal profile database 32 to determine a consumer designated electronic communication channel. In still other alternatives, any and/or all of the previously discussed channel identification mechanisms may be available.

Upon receipt of a request for pull services from a consumer, the service router component 56 may activate the intent component 58. The intent component 58 determines the nature of the request for pull services. Determination of the nature, or intent, of the request may allow identification of the company ID of the participating businesses 12 to which the request should be directed. The intent component 58 may utilize techniques such as, for example, natural language processing, keyword triggering processing, pre-defined menu choices and/or any other analysis mechanism for determining the intent of the request. Natural language processing allows a request in free-text, such as, for example, "What are the details of my flight?" With keyword trigger processing, pre-defined keywords may be identified in the request, such as, for example, "Itinerary." Pre-defined menu choices allow a choice from a list of pre-determined menu options.

Activation of the service authorizer component 60 by the service router component 56 may occur when requests for push and/or pull services are received. The service authorizer component 60 performs an authorization process. The authorization process may determine if the originator of the request has the necessary authorization level to make such a request.

Determination of the authorization level may involve verification of consent for the release and use of any customer information that may be needed to process and provide a response to the request. In addition, the level of access granted to individual consumers to obtain information from one of the participating businesses 12 responsive to requests may be determined. Further, verification may involve determining the level of personalized services to which a consumer has subscribed or agrees to subscribe. One such authorization level verification process for wireless communications device is disclosed by the commonly owned patent to Portman et al. entitled SERVICE AUTHORIZER issued by the U.S. Patent Office on Oct. 21, 2008, as U.S. Pat. No. 7,441,016 B2, which is herein incorporated by reference in its entirety.

The service authorizer component 60 may determine the authorization level based on the individual consumer making requests for pull services or intended to receive customer notification based on a request for push services. Upon receipt of a request, the service authorizer component 60 may access the consumer internal profile database 32 to verify the authorization level. The virtual key along with one of the participating businesses 12 identified by the intent component 58 may be utilized during the verification process. Alternatively, the service authorizer component 60 may include authorization level information, and/or may access any other database(s) containing such information.

The interface component 62 provides an interface to the participating businesses 12 for sending and receiving data and commands. Interfacing with the participating businesses 12 may involve formatting the request with, for example, proprietary communication protocols, HTTP, SOAP, IIOP, modem communications or any other communication protocol. In addition, interfacing may involve formatting the request in, for example, SQL, SOAP, CORBA, HTML, XML, RMI, C++, Cobol, text messages or any other format compatible with the participating businesses 12. The interface component 62 may include a plurality of interface sub-components. Each of the interface sub-components may provide an interface to one of the participating businesses 12. Accordingly, requests for pull services may be directed to a particular interface sub-component based on the identity of the participating business by the intent component 58.

The interface component 62 may similarly receive and format responses from the participating businesses 12. The responses may be provided by the participating businesses 12 in response to requests for pull services from consumers. In addition, requests for push services may be provided to the VCDB system 10 via the interface component 62.

The communication component 64 may provide the mode(s) of communication for messages to and from consumer communication devices based on identification of the electronic communication channel. Messages may include responses to request for pull services as well as customer notifications resulting from requests for push services. The communication component 64 may also place the messages on the identified electronic communication channel.

Providing the communication mode may involve, for example, creating text messages, alarms, video messages, audio messages and/or any other mechanism for conveying information based on identification of the return electronic communication channel. In addition, providing the communication mode may include protocol modification/changes, information presentation changes and/or other modifications/changes, based on the return electronic communication channel. One example technique for formatting a message in both text and/or audio messages during the course of a single interaction is described in a commonly owned patent to Portman et al. entitled MULTI-MODAL MESSAGING issued by the U.S. Patent Office on Aug. 7, 2007, and assigned U.S. Pat. No. 7,254,384 B2, which is herein incorporated by reference in its entirety. Alternatively, the communication component 64 may provide an interpretation and/or conversion function for both incoming requests from communication devices, as well as outgoing responses.

Referring once again to FIG. 2, the administrator 16 of the illustrated example also includes the transaction-monitoring module 44. In other examples, the transaction-monitoring module 44 may not be included in the administrator 16. The illustrated transaction-monitoring module 44 includes a usage-tracking component 68 and a data-mining component 70.

The usage-tracking component 68 may create an electronic record related to the processing of each request by the request-handling module 42. The electronic records may be stored in the shared participant database 28 (FIG. 1). Alternatively, electronic records for the participating businesses 12 (FIG. 1) or groups of participating businesses 12 may be stored in the participating communication provider database 24 (FIG. 1), the company database 26 (FIG. 1), a dedicated database (not shown) and/or any other location within the VCDB system 10 (FIG. 1).

When the request is for pull services, for example, the electronic record may include the virtual key of the relevant consumer, the date/time of the request and/or the response, the intent of the request and the parameters of the request. In addition, the electronic record may include the company ID responding to the request, parameters of the response, the communication channel used for the request and the communication channel used for the response.

Similarly, when the request is for push services, the virtual key, the company ID, the date/time of the request and the communication channel may be included in an electronic record. Alternatively, the virtual key of the relevant individual may not be maintained in the electronic records. Instead, the electronic records of transactions may be fully anonymous from the consumer perspective. In addition, the company ID may be replaced with a company group ID to maintain anonymity of the participating businesses 12 (FIG. 1).

Referring once more to FIGS. 1 and 2, the data-mining component 70 may gather and process statistical data related to operation of the VCDB system 10. Operationally related data may be provided to the data-mining component 70 during operation of the VCDB system 10. The data-mining component 70 may be used to support the usage-tracking component 68 in gathering statistical data. Varying degrees of data mining with the data-mining component 70 may be used to determine, for example, how individual consumers and/or demographic categories of consumers are leveraging the supported personalized services of the VCDB system 10.

For example, demographic characteristics may be included in the consumer internal profile database 32. Transaction record data collected by the usage-tracking component 68 may then be mined by the data-mining component 70 based on the demographic characteristics. Any other operational data may also be gathered and processed by the data-mining component 70.

Figure 3:
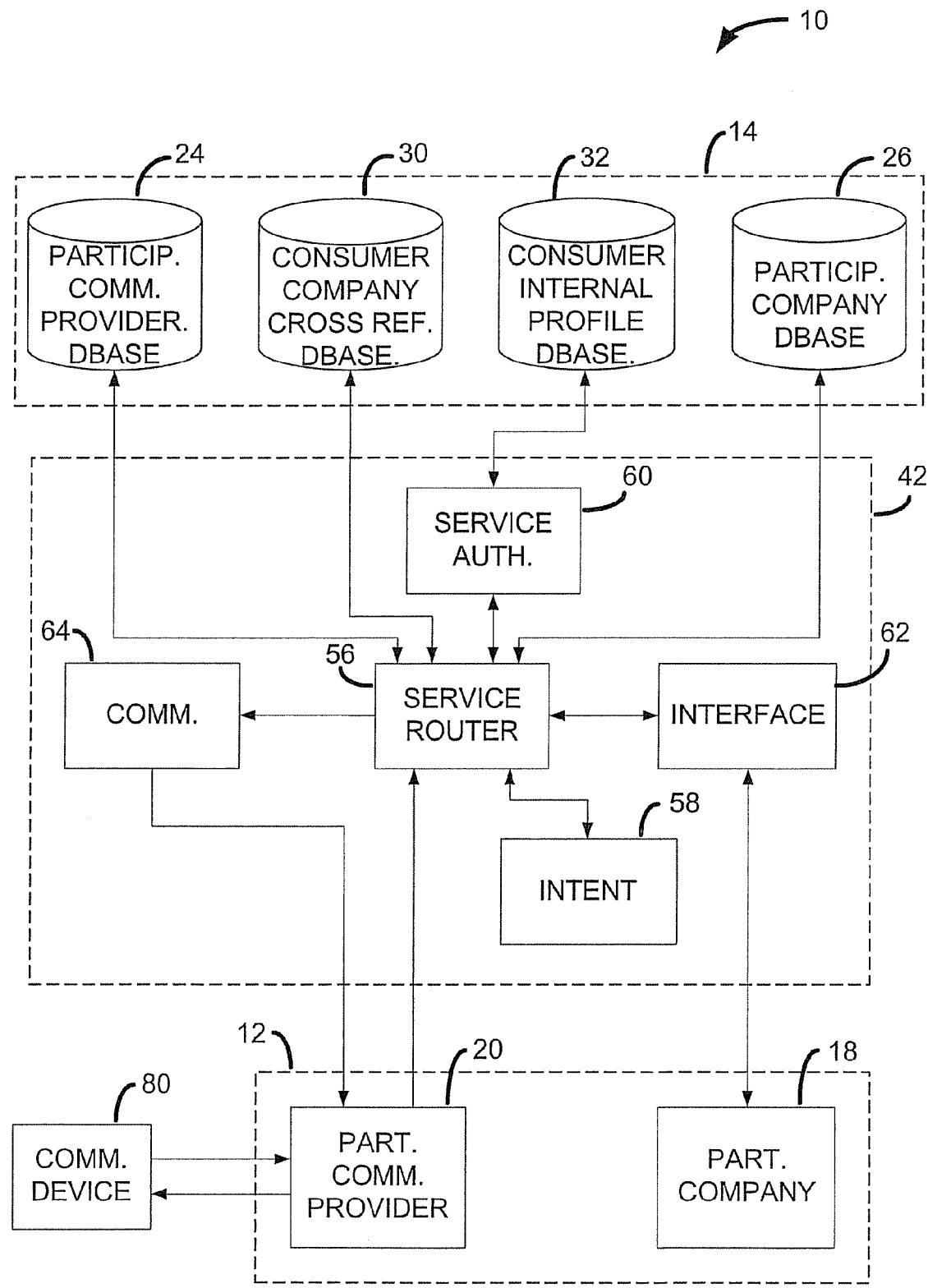
FIG. 3 is a more detailed block diagram of a portion of the virtual customer database system in FIG. 1.

FIG. 3 is a block diagram of an example the VCDB system 10 that may engage in push and/or pull services. In the illustrated example, the VCDB system 10 includes the participating businesses 12, the distributed database 14 and the request-handling module 42 operatively coupled as illustrated. In addition, at least one communication device 80 is depicted in the illustrated example as coupled with the participating businesses 12. The communication device 80 may be a wireless device and/or a wireline device. In the presently preferred embodiments, the communication device 80 is a wireless communication device.

The participating businesses 12 include at least one participating company 18 and at least one participating communication provider 20 similar to the previously discussed examples. In addition, the distributed database 14 is depicted as including the participating communication provider database 24, the participating company database 26, the consumer/company cross reference database 30 and the consumer internal profile database 32. The request-handling module 42 includes the previously discussed service router component 56, the intent component 58, the service authorizer component 60, the interface component 62 and the communication component 64.

Figure 4:
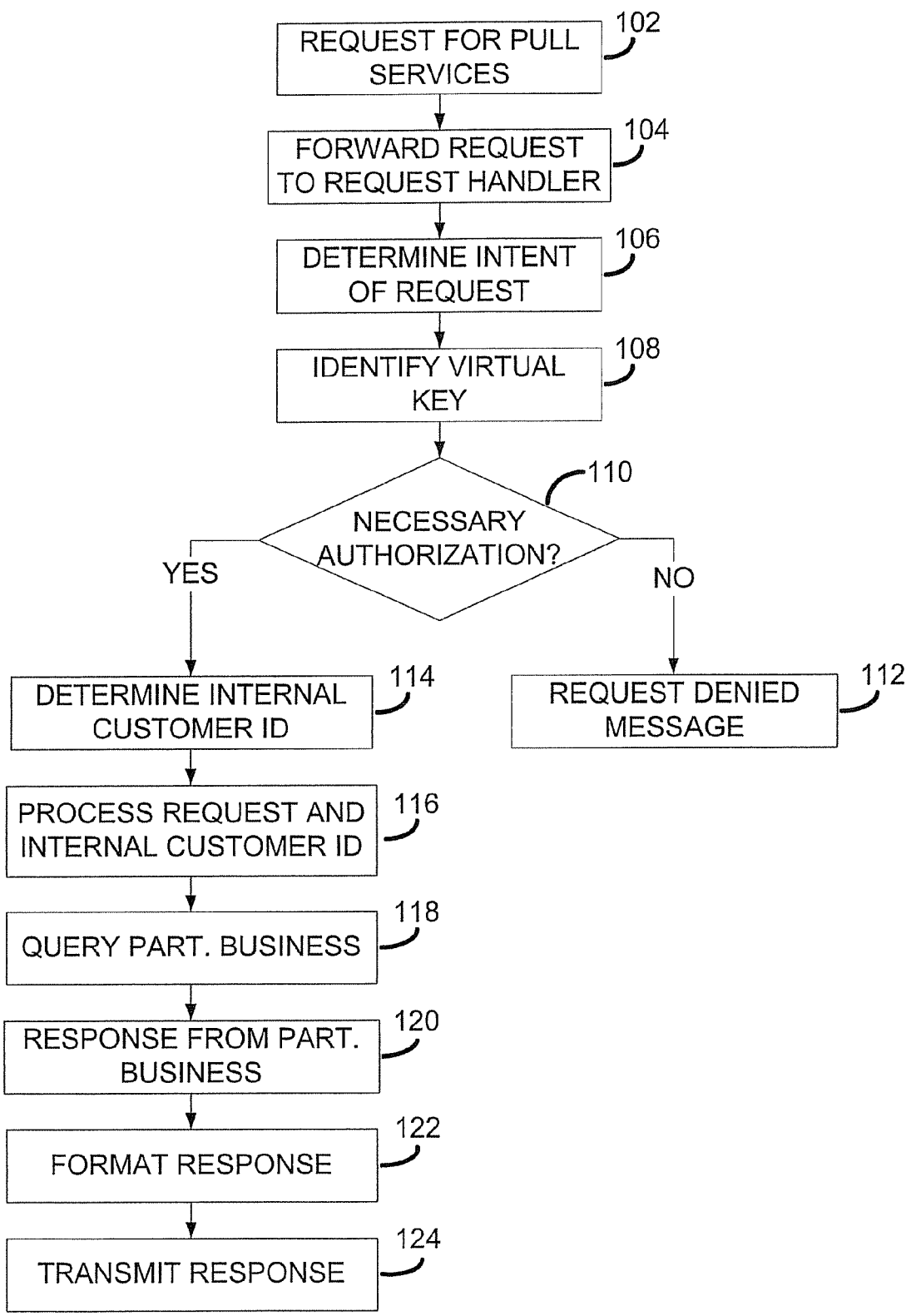
FIG. 4 is a flow diagram illustrating example operation of the portion of the virtual customer database system depicted in FIG. 3.

Referring now to the flow diagram of FIG. 4, an operational example of the VCDB system 10 illustrated in FIG. 3 will be explained when a request for pull services is received by the VCDB system 10. In this operational example, the previously discussed load and scrub processes have already occurred such that the VCDB system 10 is populated with data. The operation begins at block 102, where a request for pull services is forwarded from the communication device 80 of a consumer to the participating communication provider 20 over an electronic communication channel. At block 104, the participating communication provider 20 forwards the request to the request-handling module 42.

The service router component 56 processes the request and activates the intent module 58 to determine the intent of the request at block 106. At block 108, the service router component 56 queries the participating communication provider database 24 to determine the virtual key associated with the consumer based on the identification of the communication device 80 in the request. Once the virtual key and the intent of the request are identified, the service router component 56 activates the service authorizer component 60 to determine if the transaction has the necessary authorization level at block 110. The authorization level is determined by the service authorizer component 60.

If the necessary authorization level is not approved, a request denied message is returned to the communication device 80 via the participating communication provider 24 at block 112. If the necessary authorization level is denoted as approved, the service router component 56 queries the participating company database 26 in order to determine the internal customer ID associated with the previously identified virtual key at block 114. At block 116, the service router component 56 activates the interface component 62 based on the intent of the request and passes the request along with the internal customer ID to the interface component 62 for processing.

The interface component 62 queries the participating business, in this example, the participating company 18, to execute the consumer request at block 118. At block 120, the participating business generates a response to the request and forwards the response to the interface component 62. The response is formatted by the interface component 62, and forwarded to the communication component 64 via the service router component 56 at block 122. At block 124, the communication component 64 transmits the response back to the consumer on an electronic communication channel identified with the request and determined by the service router component 56.

Figure 5:
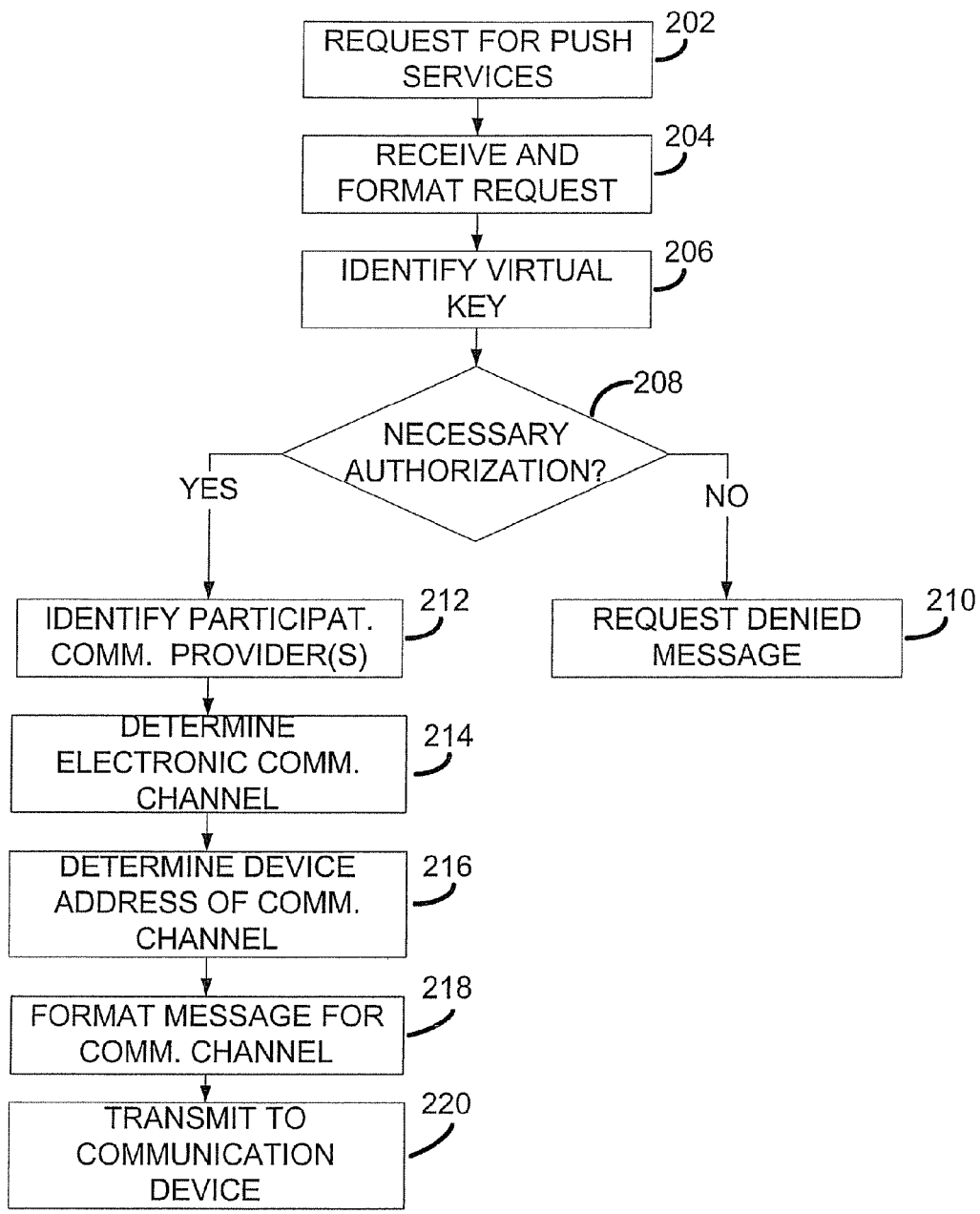
FIG. 5 is a flow diagram illustrating another example operation of the portion of the virtual customer database system depicted in FIG. 3.

Referring now to the flow diagram of FIG. 5, an operational example of the VCDB system 10 illustrated in FIG. 3 will be explained when a request for push services is received by the VCDB system 10. Similar to the operation described with reference to FIG. 4, the VCDB system 10 has previously been populated with data.

The operation begins at block 202, where a request for push services is forwarded from one of the participating businesses 12, in the illustrated example, the participating company 18, to the request-handling module 42. At block 204, the interface component 62 receives, processes, formats and forwards the request to the service router component 56. The service router component 56 queries the appropriate participating company database 26 to identify a virtual key at block 206 based on the company ID and the internal customer ID of the consumer identified in the request. At block 208, the service router component 56 activates the service authorizer component 60 to determine whether the transaction has the necessary authorization level.

If the authorization level is insufficient, a request denied message is returned via the interface component 62 to the originator of the request at block 210. If the authorization is denoted as approved, the service router component 56 utilizes the virtual key to query the consumer/company cross reference database 30 to identify participating communication provider(s) 20 available to provide communication services to the consumer at block 212. In addition, at block 214, the service router component 56 queries the consumer internal profile database 32 to determine which electronic communication channel should be used in this situation (based on time of day, business sending the message, importance of the message, etc.). In the illustrated example, the electronic communication channel for the communication device 80 associated with the company ID of the participating communication provider 20 is identified.

Following identification of the electronic communication channel, the service router component 56 queries the participating communication provider database 24 based on the company ID and the virtual key to determine the device address of the communication device 80 at block 216. At block 218, the service router component 56 activates the communication component 64 to format a message for the consumer appropriate for the identified electronic communication channel. The communication component 64 transmits the information to the communication device 80 based on the previously determined electronic communication channel and the preferences of the consumer at block 220.

The previously discussed VCDB system 10 may provide personalized services to consumers in the form of real-time external access to personalized customer data and related services. The personalized customer data and services may be provided from participating businesses 12 without requiring the participating businesses 12 to directly share customer data with each other. In addition, the VCDB system 10 acts as a liaison allowing consumers to request customer specific information without including identifying information specific to a participating business. Similarly, the participating businesses 12 may utilize the VCDB system 10 to successfully request notification of consumers without specification of the communication channels used for notification.

While the invention has been described in its currently best-known modes of operation and embodiments, other modes, embodiments and advantages of the present invention will be apparent to those skilled in the art and are contemplated herein.

What is claimed is:

1. A system for delivering personalized services to a consumer operating a communication device comprising:
a processor;
a memory storing executable instructions that when executed by the processor causes the processor to perform the steps of:
receiving a request that is a pull request from a communication device of a consumer or a push request from a participating business, the pull request received over an electronic communication channel;
querying a communication provider database and determining a virtual key of the consumer based on an ID of the communication device, if the request is a pull request, or querying a database associated with the participating business and determining the virtual key based on a company ID and an ID of the consumer, if the request is a push request;
determining an authorization level of a transaction associated with the request;
based on the determined authorization level and the virtual ID, querying a database of a company and determining the ID of the consumer associated with the virtual key, if the request is a pull request, or identifying a communication provider and a corresponding communication channel to communicate with the consumer, if the request is a push request; and
sending the request and the ID of the consumer to the company via an interface component, if the request is a pull request, or querying the identified communication provider based on the company ID and the virtual key, determining an address of the communication device, and transmitting a response to the request to the communication device over the corresponding communication channel using the address if the request is a push request.

2. The system of claim 1, wherein the memory further comprises stored executable instructions that when executed by the processor causes the processor to perform the steps of:
determining an intent of the request for pull services; and
identifying the company based on the intent of the request for pull services.

3. The system of claim 1, wherein the memory further comprises stored executable instructions that when executed by the processor causes the processor to perform the steps of:
determining if the consumer has an appropriate level of authorization to make the pull request; and
generating a request denied message if the consumer is not authorized.

4. The system of claim 1, wherein the memory further comprises stored executable instructions that when executed by the processor causes the processor to perform the steps of:
determining if the participating business has an appropriate level of authorization to make the push request; and
generating a request denied message if the participating business is not authorized.

5. The system of claim 1, wherein the memory further comprises stored executable instructions that when executed by the processor causes the processor to perform the steps of:
querying a consumer internal profile to identify the communication provider and communication channel designated within the consumer internal profile.

6. The system of claim 1, wherein the memory further comprises stored executable instructions that when executed by the processor causes the processor to perform the steps of:
querying a consumer internal profile to identify the communication channel for transmission of a response to the request for pull services; and
defaulting to the electronic communication channel upon which the request for pull services was received if the consumer internal profile is silent regarding the communication channel for transmission of a response to the request for pull services.

7. The system of claim 1, wherein the virtual key is indicative of the consumer associated with the request for pull services and is associated with an internal customer identifier of the consumer in each of a plurality of participating businesses and one or more communication services providers.

8. The system of claim 1, wherein the communication device is a wireless communication device.

9. A method of delivering personalized services to a consumer operating a communication device, the method comprising:
receiving, with a request handling module included in a server computer, a request for pull services from a communication device of a consumer, and a request for push services from a requesting participating company, the request for push services to push content to an identified consumer;
identifying a virtual key with a service router component included in the server computer, the virtual key identified from a communication provider database based on an identifier of the communication device included in the request for pull services, and the virtual key identified from a participating company database based on a company identifier of the requesting participating company and an identifier of the identified consumer included in the request for push services;
determining, with the service authorizer component, a pull services authorization level of the consumer based on the identifier of the communication device included in the request for pull services, and determining, with the service authorizer component, a push services authorization level of the requesting participating company based on the company identifier and the identifier of the identified consumer included in the request for push services;
based on the determined pull services authorization level of the consumer and the virtual key, the service authorizer component querying the participating company database and determining a participating business, and an internal customer identifier of the participating business, the internal customer identifier being an identifier of the consumer associated with the virtual key;
sending the request for pull services and the internal customer identifier of the consumer to the participating business via an interface component included in the server computer;
based on the determined push services authorization level of the requesting participating company, the service authorizer component identifying a communication provider and a corresponding communication channel to communicate with the identified consumer;

querying the identified communication provider with the interface component based on the virtual key to identify an address of a communication device of the identified consumer; and transmitting a response to the request for pull services with the interface component, the response transmitted to the communication device over the corresponding communication channel using the address.

10. The method of claim 9, further comprising the server computer forwarding a response to the request for pull services from the participating company to the communication device of the consumer as a function of a communication channel identified with the request.

11. The method of claim 9, wherein receiving a request for push services from the requesting participating company comprises initiating a request for push services with at least one of a webserver and an automated request process of the participating company.

12. The method of claim 9, wherein the communication device of the consumer comprises a wireless communication device.

13. The method of claim 9, further comprising the server computer identifying from among a plurality of participating businesses the participating business as a function of the intent of the request for pull services.

14. The method of claim 9, wherein the communication device is a wireless device and the communication services provider is a wireless services provider.

* * * * *